US006964401B1

(12) United States Patent
Kelley et al.

(10) Patent No.: US 6,964,401 B1
(45) Date of Patent: Nov. 15, 2005

(54) PROMOTIONAL ITEM AND ADVERTISING METHOD

(76) Inventors: Michael Sean Kelley, 1535 Moonstone Dr., Matthews, NC (US) 28105; William Tracey Walker, 520 W. 5th St., Unit 1017, Charlotte, NC (US) 28202

( * ) Notice: Subject to any disclaimer, the term of this patent is extended or adjusted under 35 U.S.C. 154(b) by 0 days.

(21) Appl. No.: 10/873,067

(22) Filed: Jun. 21, 2004

(51) Int. Cl.⁷ ............................................. A47B 91/00
(52) U.S. Cl. .............. 248/346.11; 206/310; 206/308.1; 206/232
(58) Field of Search ................... 248/346.11; 206/310, 206/308.1, 232

(56) References Cited

U.S. PATENT DOCUMENTS

| 2,709,905 | A | * | 6/1955 | Dunlap | 248/346.11 |
|---|---|---|---|---|---|
| 2,893,163 | A | * | 7/1959 | Hazel, Jr. | 248/346.11 |
| 3,410,514 | A | * | 11/1968 | Ford | 248/346.11 |
| 4,089,498 | A | * | 5/1978 | Woodruff | 248/346.11 |
| 4,836,488 | A | * | 6/1989 | Ross | 248/346.11 |
| 5,018,695 | A | * | 5/1991 | Bishop | 248/346.11 |
| D357,388 | S | * | 4/1995 | Gaffin | D7/625 |
| 5,725,934 | A | * | 3/1998 | Gallant | 428/195.1 |
| 5,775,659 | A | | 7/1998 | Hartlaub et al. | |
| 5,823,334 | A | | 10/1998 | Giovanni | |
| 6,013,352 | A | * | 1/2000 | Gallant | 428/195.1 |
| 6,123,191 | A | * | 9/2000 | Dean | 206/310 |
| 6,667,953 | B2 | * | 12/2003 | Matson et al. | 720/719 |
| 6,771,588 | B2 | * | 8/2004 | Poole et al. | 720/719 |
| 2002/0023886 | A1 | | 2/2002 | Lewis | |
| 2003/0131513 | A1 | * | 7/2003 | Runge | 40/718 |

FOREIGN PATENT DOCUMENTS

| DE | 10304441 A1 * | 8/2004 | A23L 2/50 |
|---|---|---|---|
| JP | 2004121564 A * | 4/2004 | A47G 23/03 |

* cited by examiner

Primary Examiner—Kimberly T. Wood
(74) Attorney, Agent, or Firm—Schwartz Law Firm P.C.

(57) ABSTRACT

A promotional item includes a digital data storage disk adapted for inserting into a player for playback by a recipient. A disk carrier holds the data storage disk. The disk carrier cooperates with the data storage disk to form a novelty beverage coaster adapted for protecting an underlying surface. A moisture-absorbent plug is inserted into a center hole formed with the data storage disk, and is adapted for receiving and, transporting moisture away from a top side of the coaster.

7 Claims, 4 Drawing Sheets

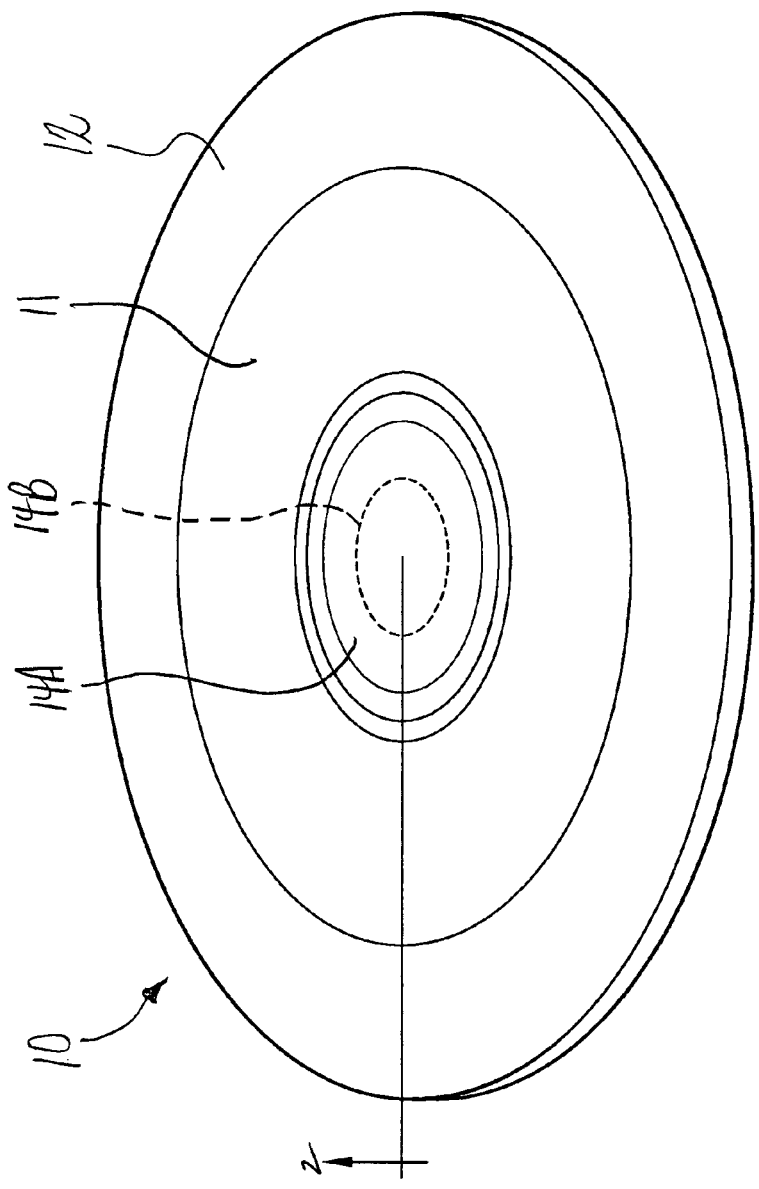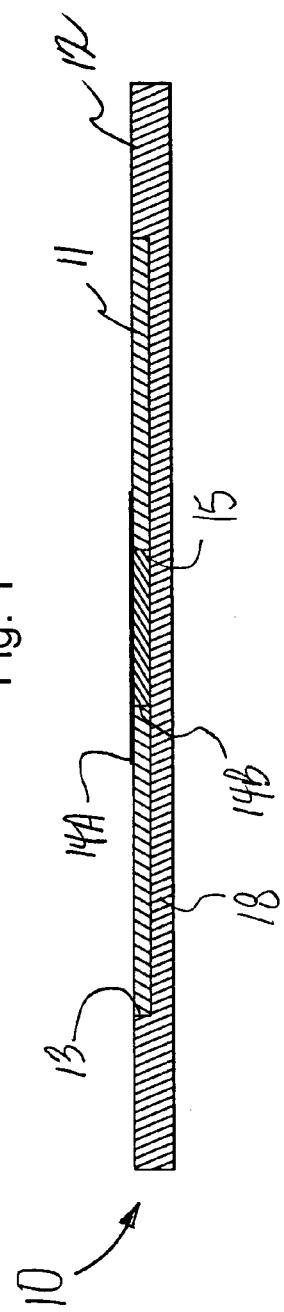

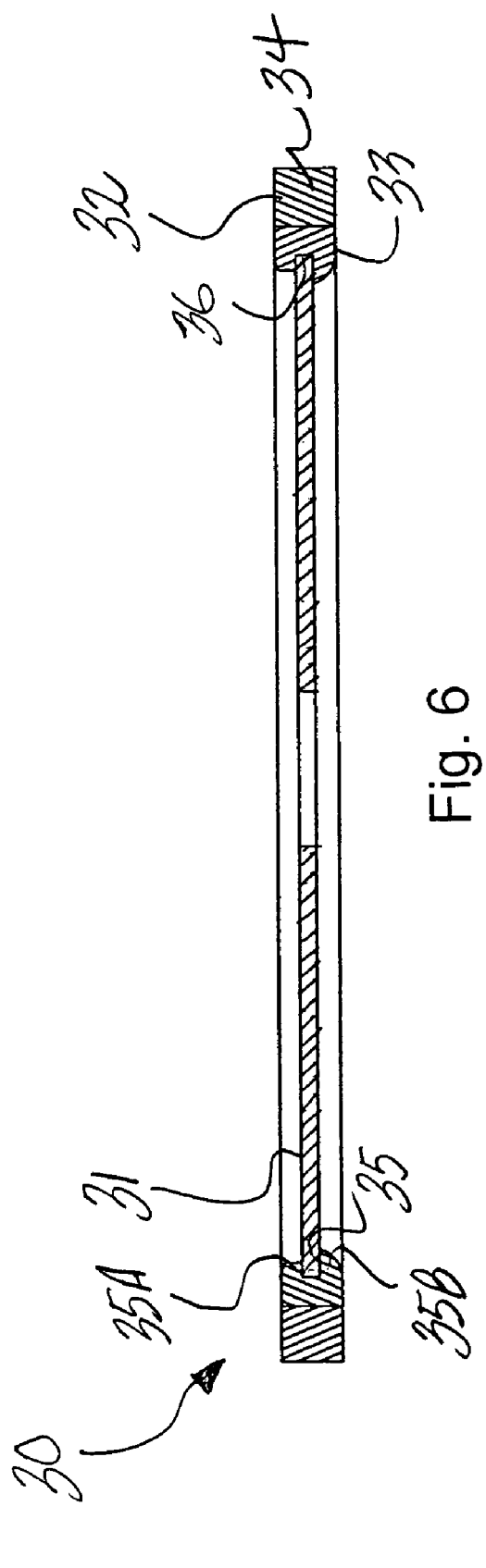
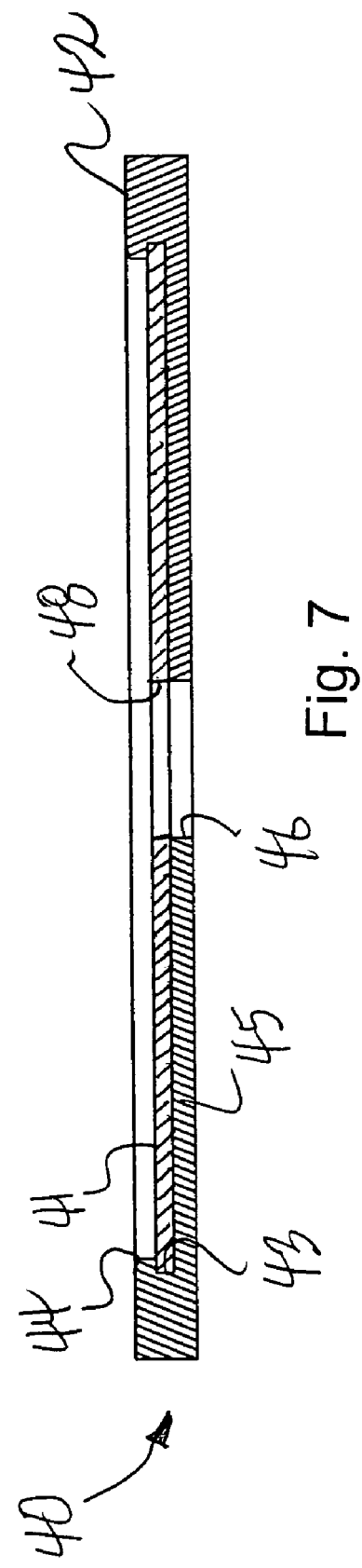

PROMOTIONAL ITEM AND ADVERTISING METHOD

TECHNICAL FIELD AND BACKGROUND OF THE INVENTION

This invention relates to a promotional item and advertising method. The invention is especially applicable to beverage manufacturers and distributors as a means of promoting their brand names.

Promotional Items, or "adcentives", usually contain some sort of advertising message, and are generally given away for free with the intention of driving up business. When a business invests in promotional items, the ultimate goal is to achieve a good return on its investment—a return generally measured by increased revenues. In 2003, businesses purchased around $7 billion dollars worth of promotional items.

Many businesses utilize promotional items (e.g. magnets, business cards, pens) to generate increased awareness about their products or services. These promotional items may be thought of as a form of targeted advertising. Promotional items typically contain little if any messaging beyond the name of the business and contact information. In marketing terms, promotional items contain rational messages that inform or remind recipients about the products and/or services offered by the business. The promotional item itself, however, is intended to elicit an emotional response in the recipient that hopefully strengthens the relationship between the recipient and the business.

A considerable disadvantage of many promotional items is their limited ability to connect with the recipient in a manner which is meaningful, creative, and long-lasting. The present invention addresses this limitation by providing a promotional item which is both innovative and cost effective, and capable of delivering a complete and powerful message to recipients. Unlike traditional promotional items, the invention offers digital multimedia advertising in a useful product which can be located on a desk and conveniently inserted into a player for playback.

SUMMARY OF INVENTION

Therefore, it is an object of the invention to provide a novelty beverage coaster which incorporates a digital data storage disk containing multimedia content. The content may be interactive, and may include text (graphics), sound, and/or motion video.

It is another object of the invention to provide a method of advertising which is innovative and cost-effective.

It is another object of the invention to provide a method of advertising which delivers multimedia content to recipients in a novel and useful promotional item.

It is another object of the invention to provide a method of advertising which includes the targeted distribution of a promotional item incorporating a digital data storage disk—the promotional item being particularly suited for use on a desk in convenient proximity to a player for playback of content stored on the disk.

These and other objects of the present invention are achieved in the preferred embodiments disclosed below by providing a promotional item including a digital data storage disk adapted for inserting into a player for playback by a recipient. A disk carrier holds the data storage disk. The disk carrier cooperates with the data storage disk to form a novelty beverage coaster adapted for protecting an underlying surface. A moisture-absorbent plug is inserted into a center hole formed with the data storage disk, and is adapted for receiving and transporting moisture away from a top side of the coaster.

According to another preferred embodiment, the data storage disk contains multimedia advertising including text, sound, and/or motion video.

According to another preferred embodiment, the moisture-absorbent plug includes paper fiber, such as European pulp. Alternatively, the plug may be constructed of other moisture absorbing or non-moisture absorbing materials including neoprene, polyurethane, cork, polystyrene, and plastic. The plug may be separately formed and attached to the carrier by means of an adhesive backing, or may be integrally formed with the carrier by means of a stamping or molding process.

According to another preferred embodiment, the disk carrier includes paper fiber, such as European pulp. Alternatively, the carrier may be constructed of other materials including neoprene, polyurethane, cork, polystyrene, and plastic.

According to another preferred embodiment, the disk carrier has a back wall forming a bottom side of the coaster.

According to another preferred embodiment, the back wall has a center hole in substantial registration with the center hole of the data storage disk.

According to another preferred embodiment, the disk carrier has an annular disk cavity for receiving the data storage disk.

According to another preferred embodiment, the disk carrier comprises a anti-spill ring which extends around an outer peripheral edge of the data storage disk.

According to another preferred embodiment, the anti-spill ring has an inner peripheral track which defines a disk-retaining groove receiving the data storage disk.

In another embodiment, the invention is a promotional item including a digital data storage disk adapted for inserting into a player for playback by a recipient. A disk carrier holds the data storage disk. The disk carrier cooperates with the data storage disk to form a novelty beverage coaster adapted for protecting an underlying surface. The disk carrier has a rigid inner margin engaging an outer peripheral edge of the data storage disk, and a less rigid moisture-absorbent outer margin for receiving and transporting moisture away from a top side of the coaster.

In yet another preferred embodiment, the invention is a method of advertising. The method includes the steps of creating multimedia advertising content, and storing the content on a digital data storage disk. The data storage disk is then inserted into a disk carrier. The data storage disk and disk carrier cooperate to form a novelty beverage coaster adapted for protecting an underlying surface. The novelty coaster is then distributed to a recipient as a promotional item. The data storage disk is adapted for being inserted into a player for playback of the advertising content to the recipient.

According to another preferred embodiment, the method includes inserting the entire novelty coaster into the player for playback of the advertising content stored on the data storage disk.

According to another preferred embodiment, the method includes snap-attaching the data storage disk into an inner peripheral groove formed with the disk carrier.

According to another preferred embodiment, the method includes printing advertising indicia on the novelty coaster.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is a perspective view of a novelty beverage coaster according to one preferred embodiment of the present invention;

FIG. 2 is a cross-sectional view of the coaster taken substantially along line 2 of FIG. 1;

FIG. 5A is an enlarged view of the area indicated at reference 5A in FIG. 5;

FIG. 6 is a cross-sectional view of a novelty beverage coaster according to a third preferred embodiment; and FIG. 7 is a cross-sectional view of a novelty beverage coaster according to a fourth preferred embodiment.

DESCRIPTION OF THE PREFERRED EMBODIMENT AND BEST MODE

Figure 3:
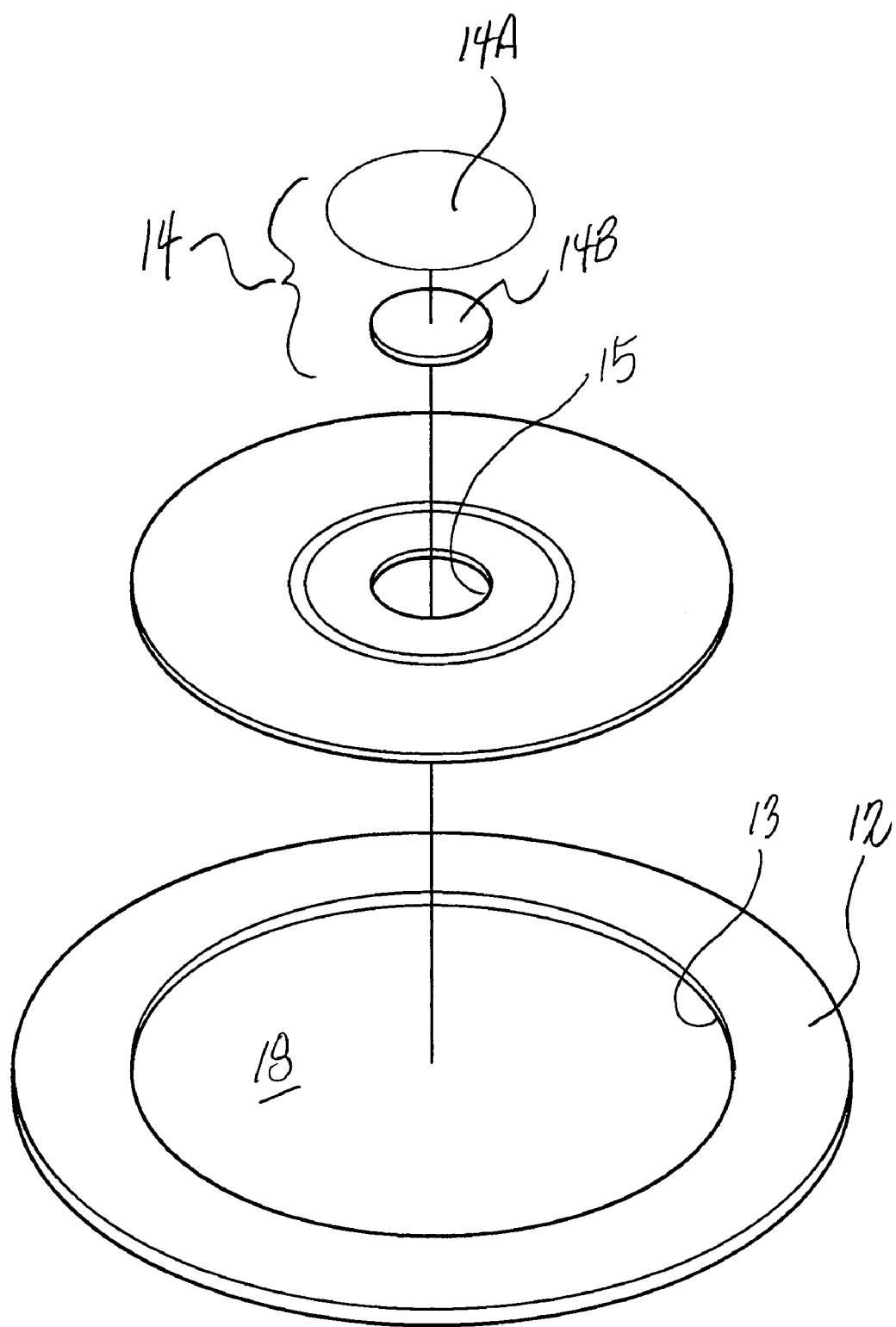
FIG. 3 is an exploded view of the coaster.

Referring now specifically to the drawings, a novelty beverage coaster according to the present invention is illustrated in FIG. 1, and shown generally at reference numeral 10. The beverage coaster 10 comprises a data storage disk 11 and disk carrier 12 which combine to form an interesting and stylish protective barrier between a beverage glass, bottle or container and an underlying surface. The data storage disk 11 contains multimedia advertising content including text, sound, and/or motion video intended for playback by a recipient using a conventional player. The advertising content provides a message designed to promote products, services, events, and other business, while creating a meaningful and long-lasting impression on the recipient. The novelty coaster 10 may be located on a desk or other surface in convenient proximity to a CD/DVD player incorporated in most desktop and laptop computers. The data storage disk 11 may be any standard 8 cm mini-disk, CD single, multimedia DVD, or other digital data storage medium.

Referring to FIGS. 1, 2, and 3, the disk carrier 12 comprises a flat sheet of heavy weight card stock or paperboard which is stamped to form an annular recess 13 of sufficient size and depth to closely receive and frictionally hold the data storage disk 11. After placing the disk 11 within the recess 13, a moisture-absorbent plug 14 is inserted into the center hole 15 of the disk 11. The plug 14 has a relatively large-diameter, thin, flat, protective top 14A, and a smaller diameter, thicker body 14B which extends inside the center hole 15 towards a back wall 18 of the disk carrier 11. When a cold beverage is placed on the coaster 10, its sweat is absorbed directly through the top 14A and into the absorbent body 14B of the plug 14. The top 14A and body 14B of the plug 14 may be formed separately of paper or other absorbent fibers, and then attached together by any suitable means, such as gluing. In an alternative embodiment, all or a portion of the top 14A may be constructed of an anti-slip material, such as a textured rubber.

Figure 4:
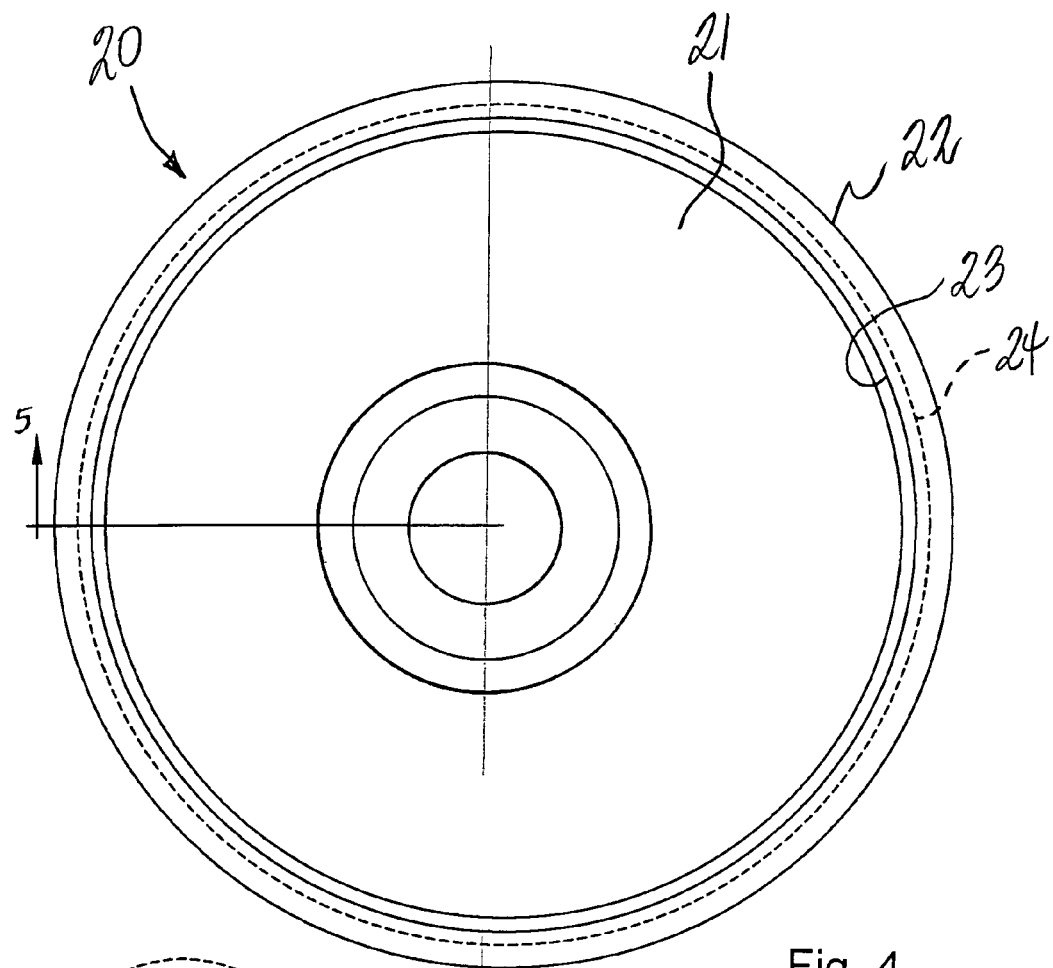
FIG. 4 is a top view of a novelty beverage coaster according to a second preferred embodiment.
Figure 5:
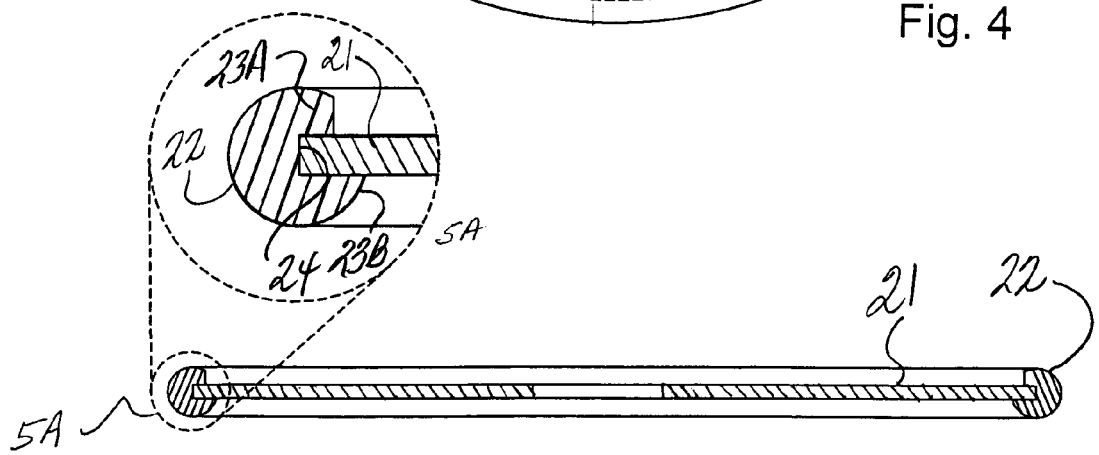
FIG. 5 is a cross-sectional view taken substantially along line 5 of FIG. 4.

FIGS. 4, 5, and 5a, illustrate a second embodiment of a novelty beverage coaster 20 according to the present invention. The coaster 20 comprises a data storage disk 21 combined with a removable anti-spill ring 22. The anti-spill ring 22 has an inner peripheral track 23 which defines a disk-retaining groove 24 designed to receive an outer peripheral edge of the data storage disk 21. As best shown in FIG. 5a, the track 23 includes spaced upper and lower annular flanges 23A and 23B. The upper flange 23A defines a reduced radial projection which enables convenient snap-attachment of the disk 21 into the groove 24. The lower flange 23B projects radially inwardly a greater distance sufficient to support the disk 21 under the weight of the beverage glass, bottle, or container. The spill ring 22 is formed of any suitable rigid or semi-rigid material including molded plastic, neoprene, polyurethane, polystyrene, or the like.

Further embodiments of the novelty beverage coaster are illustrated in FIGS. 6 and 7, respectfully. As shown in FIG. 6, coaster 30 includes data storage disk 31 and disk carrier 32. The disk carrier 32 comprises inner and outer margins 33 and 34. The inner margin 33 has an inner peripheral track 35 which defines a disk-retaining groove 36 designed to receive an outer peripheral edge of the data storage disk 31. The track 35 includes spaced upper and lower annular flanges 35A and 35B. The upper flange 35A defines a reduced radial projection which enables convenient snap-attachment of the disk 31 into the groove 36. The lower flange 35B projects radially inwardly a greater distance sufficient to support the disk 31 under the weight of the beverage glass, bottle, or container. The outer margin 34 is attached to the inner margin 33 by gluing or other suitable means, and is constructed of a moisture-absorbent material such as a heavy weight card stock or paperboard.

The beverage coaster 40 shown in FIG. 7 comprises a data storage disk 41 and disk carrier 42. The disk carrier 42 has an inner peripheral, disk-retaining groove 43 designed to receive an outer peripheral edge of the data storage disk 41. An upper annular flange 44 defines a reduced radial projection which enables convenient snap-attachment of the disk 41 into the groove 43. A back wall 45 of the disk carrier 42 forms a bottom of the novelty coaster 40, and defines a center hole 46 adapted for alignment with the center hole 48 of the data storage disk 41. In this embodiment, the data storage disk 41 can be played by inserting the entire combination 40 into a conventional player. The disk carrier 42 is preferably constructed of a moisture-absorbent material such as a heavy weight card stock or paperboard.

Preferably, in each of the above embodiments, the disk carrier contains printed advertising indicia related to or associated with the multimedia content contained on the data storage disk. When combined, the resulting beverage coaster is intended to elicit an emotional response in the recipient that strengthens the relationship between the recipient and the advertising business.

A novelty beverage coaster and advertising method are described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

We claim:

1. A promotional item, comprising:
   (a) a digital data storage disk adapted for inserting into a player for playback by a recipient;
   (b) a disk carrier holding said data storage disk, and cooperating with said data storage disk to form a novelty beverage coaster adapted for protecting an underlying surface; and (c) a moisture-absorbent plug inserted into a center hole formed with said data storage disk, and adapted for receiving and transporting moisture away from a top side of said coaster.

2. A promotional item according to claim 1, wherein said data storage disk contains multimedia advertising comprising text, sound, and motion video.

3. A promotional item according to claim 1, wherein said moisture-absorbent plug comprises paper fiber.

4. A promotional item according to claim 1, wherein said disk carrier comprises paper fiber.

5. A promotional item according to claim 1, wherein said disk carrier comprises a back wall forming a bottom side of said coaster.

6. A promotional item according to claim 1, wherein said disk carrier defines an annular disk cavity receiving said data storage disk therein.

7. A promotional item according to claim 1, wherein said disk carrier comprises a anti-spill ring extending around an outer peripheral edge of said data storage disk.

* * * * *